(12) United States Patent
Ando et al.

(10) Patent No.: US 7,780,945 B2
(45) Date of Patent: Aug. 24, 2010

(54) METHOD OF AND APPARATUS FOR PRODUCING HYDROGEN FROM METHANOL

(75) Inventors: Toshihiro Ando, Tsukuba (JP); Kiyoharu Nakagawa, Tsukuba (JP)

(73) Assignees: Japan Science and Technology Agency, Kawaguchi-shi (JP); National Institute for Materials Science, Tsukuba-shi (JP)

( * ) Notice: Subject to any disclaimer, the term of this patent is extended or adjusted under 35 U.S.C. 154(b) by 1067 days.

(21) Appl. No.: 10/548,527

(22) PCT Filed: Mar. 9, 2004

(86) PCT No.: PCT/JP2004/003005

§ 371 (c)(1),
(2), (4) Date: Sep. 12, 2005

(87) PCT Pub. No.: WO2004/080890

PCT Pub. Date: Sep. 23, 2004

(65) Prior Publication Data

US 2006/0210471 A1 Sep. 21, 2006

(30) Foreign Application Priority Data

Mar. 14, 2003 (JP) ............................. 2003-071088

(51) Int. Cl.
*C01B 3/26* (2006.01)
*B01J 7/00* (2006.01)
(52) U.S. Cl. .......................................... 423/651; 48/61
(58) Field of Classification Search ................ 423/648.1

See application file for complete search history.

(56) References Cited

U.S. PATENT DOCUMENTS 6,544,400 B2 * 4/2003 Hockaday et al. ............ 205/338

(Continued)

FOREIGN PATENT DOCUMENTS

JP 9-187653 7/1997

(Continued)

OTHER PUBLICATIONS

Nakagawa, Kiyoharu, et al., Diamond supported metal catalyst: a novel medium for hydrogen production from methanol decomposition, Catalysis Letters, 2002, vol. 80, No. 3, 4, pp. 161 to 164.*

(Continued)

*Primary Examiner*—Melvin C Mayes
*Assistant Examiner*—Sheng Han
(74) *Attorney, Agent, or Firm*—Westerman, Hattori, Daniels & Adrian, LLP

(57) ABSTRACT

A method that allows producing hydrogen from methanol in a simple manner and an apparatus that is small in size and light in weight, which can produce hydrogen from methanol, are provided. The apparatus comprises a container (4) that retains liquid methanol (2) as a source material and gases (3) generated therein, a substrate (5) that is immersed in liquid methanol (2) in the container (4) loaded with a catalyst, and a power supply (6) for passing a direct or an alternating current through the substrate (5). The substrate may be made of an oxide or oxidized material, especially oxidized diamond, and loaded with a transition metal catalyst, especially Ni catalyst. With the substrate (5) heated, a novel catalytic methanol decomposition reaction occurs by a combination of abrupt temperature gradient directing towards methanol from the surface of the substrate, a catalysis of the oxide or oxidized material of the substrate and a catalysis of the catalyst loaded on the substrate, and a large amount of hydrogen gas is produced.

2 Claims, 5 Drawing Sheets

U.S. PATENT DOCUMENTS 6,607,707 B2 * 8/2003 Reichman et al. ......... 423/648.1
2002/0098129 A1 * 7/2002 Martin et al. ............... 422/173
2006/0057039 A1 * 3/2006 Morse et al. ................ 422/198

FOREIGN PATENT DOCUMENTS

JP          2002-173302        6/2002

OTHER PUBLICATIONS

Yafei Zhang et al.; "Synthesis of aligned carbon nanotubes in organic liquids", J. Mater. Res., vol. 17, No. 9, Sep. 2002, pp. 2457-2464. Cited ISR.

Kiyoharu Nakagawa et al.; "Diamond-supported metal catalyst: a novel medium for hydrogen production from methanol decomposition", Catalysis Letters, vol. 80, No. 3-4, Jun. 2002, pp. 161-164. Cited ISR.

Yoshikazu Usami et al.; "Catalytic methanol decomposition at low temperatures over palladium supported on metal oxides", Elsevier, General 171, 1998, pp. 123-130. Cited PCT Art. 34 Amend.

* cited by examiner

METHOD OF AND APPARATUS FOR PRODUCING HYDROGEN FROM METHANOL

TECHNICAL FIELD

The present invention relates to a method of producing hydrogen from methanol and an apparatus for producing hydrogen from methanol, which is small in size and light in weight.

BACKGROUND ART

A fuel cell is a power source that outputs electric energy directly converted from chemical energy of the fuel, therefore its energy conversion efficiency is high, and consequently it is an environment-friendly power source. Among fuel cells, a fuel cell of the type using hydrogen and oxygen as the fuels is becoming practical use as a pollution-free power source mainly for automobiles, because their reaction product is water.

Now, in the automobiles having such a fuel cell as their power source, there are systems, one of which carries a cylinder filled with a high pressure hydrogen gas and uses hydrogen gas thereof as a fuel, and the other of which carries a fuel such as petroleum or methanol and uses the hydrogen produced by a hydrogen producing apparatus so called fuel reformer from fuel thereof.

Since hydrogen gas has an extremely large risk of explosion by mixing with air, it is more desirable for safety to use the system which carries a fuel such as petroleum or methanol and produce only a necessary amount of hydrogen gas from fuel thereof when needed, than to use the system which carries a cylinder filled with a high pressure hydrogen gas and use hydrogen gas thereof.

However, since a conventional hydrogen producing apparatus is large in size and consumes a large amount of energy for hydrogen producing, there has not been the practical use for automobiles or the like. Mention thereof may be made more specifically by referencing to an exemplary hydrogen producing apparatus in the prior art.

In this connection, though apparatuses for producing hydrogen gas from methanol have not existed, the art is known for generating hydrogen by gaseous methanol decomposition (Japan Patent laid open H9-187653 [1997], Yoshikazu Usami, et al., 'Catalytic methanol decomposition at low temperature over palladium supported on metal oxides' Applied Catalysis A: General 171 [1998] 123-130, Kiyoharu NAKAGAWA, et. Al., Diamond-supported metal catalyst: a novel medium for hydrogen production from methanol decomposition, Catalysis Letters, 2002, vol.80, No.3, 4, p. 161-164), and the explanation of the conventional apparatus described below is based on this art.

FIG. 5 is a diagrammatic view of a conventional hydrogen producing apparatus for producing hydrogen gas from methanol. In the Figure, liquid methanol 51 is introduced into a methanol vaporizer 53 heated to a temperature of about 300° C. by a heater 52 such as a burner to be vaporized into methanol gas 54, and the methanol gas 54 is introduced into a catalyst bed 55. As catalyst bed 55 has a layer structure of catalyst 56 comprising catalyst particles 56 of Pd/CeO$_2$ or the like which can decompose methanol into hydrogen gas and other gaseous components mainly including carbon dioxide gases, the vaporized methanol 54 introduced into the catalyst bed 54 is decomposed by the catalyst 56 into hydrogen and other gases mainly including carbon dioxide 57. The catalyst bed 55 needs to be heated for activating the catalyst 56 to a temperature of about 300° C. by a heater 52 such as a burner. Hydrogen and other gases mainly including carbon dioxide 57, which are produced through the decomposition by the catalyst bed 55, are introduced into a separator 58 where they are separated into hydrogen gas 60 and other gases 59 whereby hydrogen gas 60 is produced. The separator 58 may, for example, be a selective adsorber adapted to selectively adsorb carbon dioxide gas.

In the vaporizer 53 of the apparatus, however, it is necessary to maintain the vaporizer 53 as a whole at the high temperature of about 300° C. by heating for maintaining the vaporizing rate always high, by which producing immediately when needed, an amount of hydrogen gas needed for generating a driving force of the automobile, and it has the size which can not be ignored as compared with the size of automobile.

Also, in the catalyst bed 55 of the apparatus, however, it is necessary to maintain the catalyst bed 55 as a whole at the high temperature of about 300° C. by heating for maintaining the reaction rate of the catalyst always high, by which producing immediately when needed, an amount of hydrogen gas needed for generating a driving force of the automobile, and it has the size which can not be ignored as compared with the size of automobile.

Thus, the conventional hydrogen producing apparatus is too large in size and in weight, and consumes too much energy for heating the vaporizer and the catalyst bed, to be equipped in practice for any automobile.

DISCLOSURE OF THE INVENTION

With the aforementioned problems taken into account, it is an object of the present invention to provide a method of producing hydrogen from methanol in a simple manner and an apparatus that is small in size and light in weight, which can produce hydrogen from methanol.

In order to achieve the above objects, there is provided in accordance with the present invention a method of producing hydrogen from methanol characterized in that it comprises a step of heating a substrate loaded with a catalyst in liquid methanol to produce hydrogen gas.

Said catalyst is preferably a catalyst made of a transition metal element, especially Ni catalyst.

Said substrate loaded with the catalyst is preferably an oxide or oxidized substrate made of a material which can be selected from the group which consists of oxidized diamond, silicon dioxide, zirconium dioxide, activated carbon, cerium dioxide and titanium dioxide. Alternatively, said substrate loaded with the catalyst is preferably activated carbon. Also, said substrate preferably has an electric conductivity or has a resistive substance, through which by passing a current, said heating of the substrate is performed. Said substrate is heated preferably to a temperature of 300° C. or more.

The present invention further provides an apparatus for producing hydrogen from methanol, characterized in that it comprises: a container for holding liquid methanol; a substrate loaded with a catalyst, which is immersed in said liquid methanol; and a substrate heating means for heating said substrate, wherein said substrate in said liquid methanol is heated, gases are produced at the surface of said heated substrate, the gases are taken out, and hydrogen gas is obtained by gas separation means from said taken out gases.

The present invention further provides an apparatus for producing hydrogen from methanol, characterized in that it comprise: a container for holding liquid methanol; a substrate loaded with a catalyst; and a substrate heating means for heating said substrate, in which said catalyst is made of a transition metal, and said substrate is an oxide or oxidized substrate or activated carbon substrate, wherein said substrate is heated in said liquid methanol, gases are produced at the surface of said heated substrate, the gases are taken out, and hydrogen gas is obtained by gas separation means from said taken out gases.

Said catalyst made of a transition metal is preferably Ni catalyst. Also, said oxide substrate preferably is made of oxidized diamond. Alternatively, said oxide substrate may preferably be made of a material selected from the group which consists of silicon dioxide, zirconium dioxide, cerium dioxide and titanium dioxide.

Said substrate heating means comprises an electric power supply for passing an electric current through said substrate or said resistive substance. Said oxide or activated carbon substrate is heated preferably to a temperature of 300° C. or more.

According to the method and apparatus of the present invention, by heating the substrate loaded with the catalyst in liquid methanol, an abrupt temperature gradient directing towards the liquid methanol from a surface of the substrate is created, and by a combination of this abrupt temperature gradient, the catalysis of the substrate and the catalysis of the catalyst loaded on the substrate, a novel methanol decomposition reaction is yielded, and by this methanol decomposition reaction, methanol surrounding the surface of the substrate is decomposed to generate hydrogen gas. If the substrate is made of an oxide or oxidized material, in particular oxidized diamond and the catalyst comprises Ni, then the hydrogen production efficiency is eminently high.

Thus, the method of the present invention allows producing hydrogen in the simple manner only to heat a substrate loaded with a catalyst in methanol, hence it requires only one container instead of hitherto indispensable two containers, one for methanol vaporization and one for methanol decomposition in the conventional apparatus, thereby it becomes possible to make the apparatus to be small.

Moreover, the reaction rate of the novel methanol decomposition reaction which is yielded by the combination of abrupt temperature gradient directing towards the liquid methanol from the surface of substrate, the catalysis of oxide or oxidized substrate, and the catalysis of catalyst loaded on the substrate, is extremely higher than that of conventional reaction, hence it is possible to make the apparatus small in size and weight comparing with the conventional apparatus having the same hydrogen producing rate. Also, the reaction rate of the novel methanol-decomposition reaction which is yielded by the combination of the abrupt temperature gradient directing towards the liquid methanol from the surface of substrate, the catalysis of oxide or oxidized substrate and the catalysis of catalyst loaded on the substrate, is extremely high, hence the consumption energy required to produce hydrogen is small.

BRIEF DESCRIPTION OF THE DRAWINGS

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof. In the drawings.

BEST MODES FOR CARRYING OUT THE INVENTION

Figure 1:
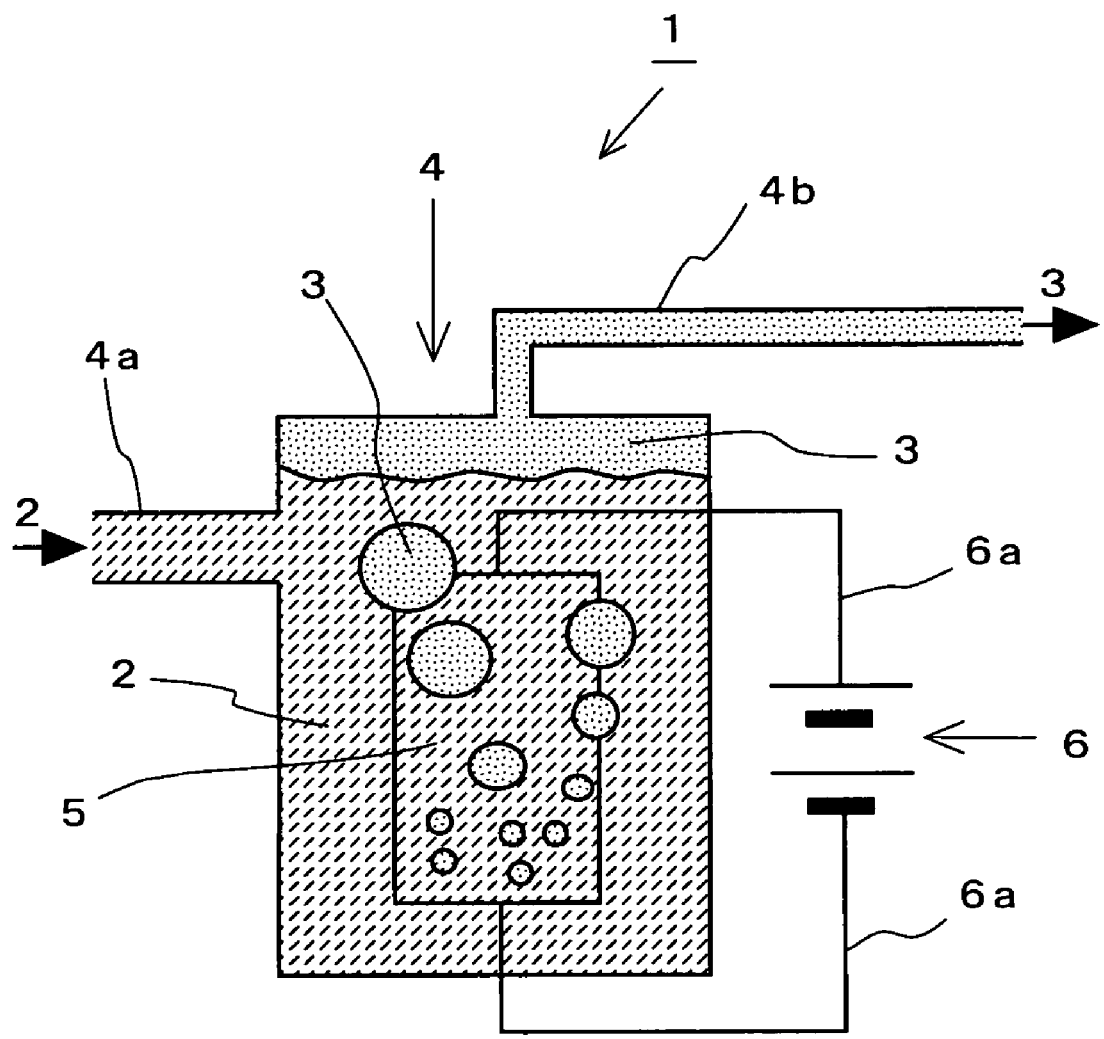
FIG. 1 is a diagram illustrating the makeup of an apparatus for producing hydrogen from methanol in accordance with the present invention.

Hereinafter, the present invention will be described in detail with reference to forms of implementation thereof illustrated in the drawing figures. Mention is made of a method of producing hydrogen from methanol using an apparatus according to the present invention.

FIG. 1 is a diagram illustrating the makeup of an apparatus for producing hydrogen from methanol in accordance with the present invention, wherein the same reference characters are used to designate the same members or components.

An apparatus 1 for producing hydrogen from methanol in accordance with the present invention comprises a receptacle or container 4 that holds liquid methanol 2 and gases 3 generated therein, a substrate 5 loaded with a catalyst, which is immersed in liquid methanol 2 of container 4, and a power supply 6 for passing a direct or an alternating electric current through substrate 5 to heat the substrate. While in form of the implementation it is shown that the substrate heating means is an electric power supply for passing the electric current through substrate 5, it may be any other means that can heat the substrate, such as a heater, for example.

Substrate 5 is made of an oxide or oxidized material, and loaded by the catalyst of a transition metal. For example, the substrate which is made of the steps of vapor-depositing a transition metal on a substrate made of an oxide or oxidized material and reduction-treating in hydrogen, is usable.

In an operation of this hydrogen producing apparatus 1 described above, liquid methanol 2 is supplied into container 4 through its methanol inlet port 4a so that substrate 5 is immersed in liquid methanol 2. Then, with supplying the electric current from power supply 6 through electric wires 6a, substrate 5 is heated to a temperature of 300° C. or more preferably as later described. When substrate 5 is heated, bubbles of gases 3 comprising mainly hydrogen gas are vigorously generated from the surfaces of substrate 5. Gases 3 are taken out or collected through gas outlet port 4b. Gases 3 taken out contain mainly hydrogen gas, carbon monoxide gas and very small amount of other gases such as carbon dioxide and methane. Then, by separating the gases taken out through a known gas separator, hydrogen gas is obtained.

As the hydrogen producing apparatus described above can decompose methanol 2 and produce gases 3 mainly containing hydrogen gas, only by heating the substrate 5 loaded with the catalyst, it requires only one container in stead of the hitherto indispensable two containers, one for methanol vaporization and one for methanol decomposition in a conventional apparatus as mentioned hereinbefore, hence it is possible to make the apparatus to be small in size. Moreover, as the methanol decomposition reaction of the method of the present invention is eminently higher in reaction rate, as will be shown in the specific example below, than that of the conventional method in which vaporized methanol is decomposed by catalyst, it is possible to produce a sufficient amount of hydrogen gas, even if the apparatus is made smaller in size. And for the same reason, the consumption energy to produce hydrogen is small.

While a precise mechanism of the methanol decomposition reaction of the method of the present invention has not been yet fully elucidated, it appears that the novel methanol decomposition reaction occurs by the combination of the abrupt temperature gradient directing towards liquid methanol from the surface of the substrate, the catalysis of the substrate made of oxide or oxidized material and the catalysis of the catalyst loaded on the substrate.

Mention is next made of a specific example.

Conversion efficiencies were compared, which are measured by using the apparatus of the present invention as shown in FIG. 1 by changing the kinds of the substrates and the catalysts loaded thereon. The substrates used are oxidized diamond (O-dia), silicon dioxide ($SiO_2$), zirconium diode ($ZrO_2$), activated carbon (AC), cerium diode ($CeO_2$), titanium diode ($TiO_2$), alumina ($Al_2O_3$) or magnesium oxide (MgO), and the catalysts loaded on the substrate are Ni, Co, Rh, Ir, Cu, Pt or Ru.

The experiment was executed by using the substrate which was prepared for every combinations of the above mentioned substrates and the catalysts by forming a thin film of the catalytic metal on the substrate by sputtering, vapor deposition or impregnation, and followed with reducing the surface of the substrate in hydrogen gas atmosphere. In each the experiment, the electric current through the substrate was controlled so that the substrate has a fixed temperature of 300° C., and measurements were made on the amount of gases generated in a time period of 30 minutes and also on the composition ratio of the gases.

Figure 2:
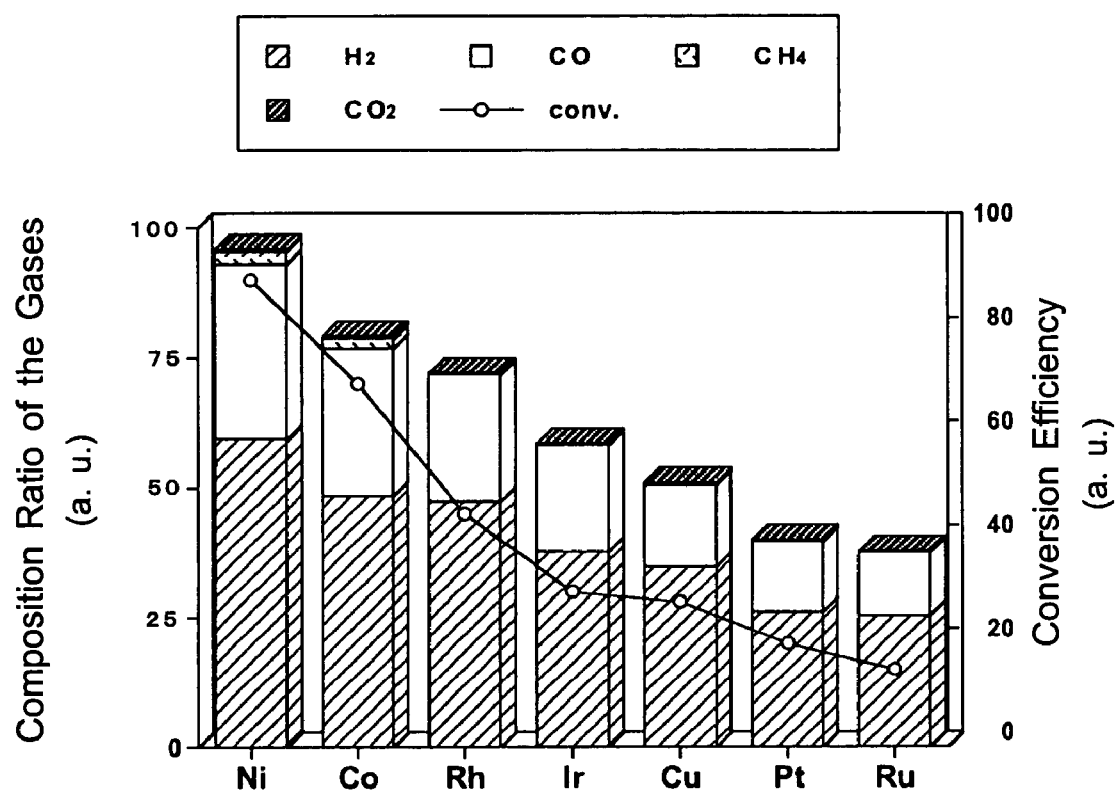
FIG. 2 is a graphic chart illustrating the hydrogen production efficiency obtained in the method using the substrate made of oxidized diamond and the catalyst varied variously.

FIG. 2 is a graph illustrating the conversion efficiencies of methanol into hydrogen, which were obtained for the substrate of oxidized diamond and for every catalysts of Ni, Co, Rh, Ir, Cu, Pt or Ru. In the graph, the ordinate axis in the right hand side represents the conversion efficiency, the abscissa axis represents the kind of the catalysts and the ordinate axis in the left hand side represents the composition ratio of the gases, respectively. In the chart, the line graph represents the conversion efficiencies and the bar graph represents the composition ratios of the gases. Here, the conversion efficiencies and the composition ratios are represented by mol ratio, and the units of the ordinate axes are arbitrary scales for relative comparison.

As can be seen from the graph, a highest conversion efficiency is achieved with the catalyst of Ni, The composition ratio of the Gases comprises with the range of 60 to 70% of hydrogen gas and the residue of carbon monoxide, carbon dioxide and methane.

Figure 3:
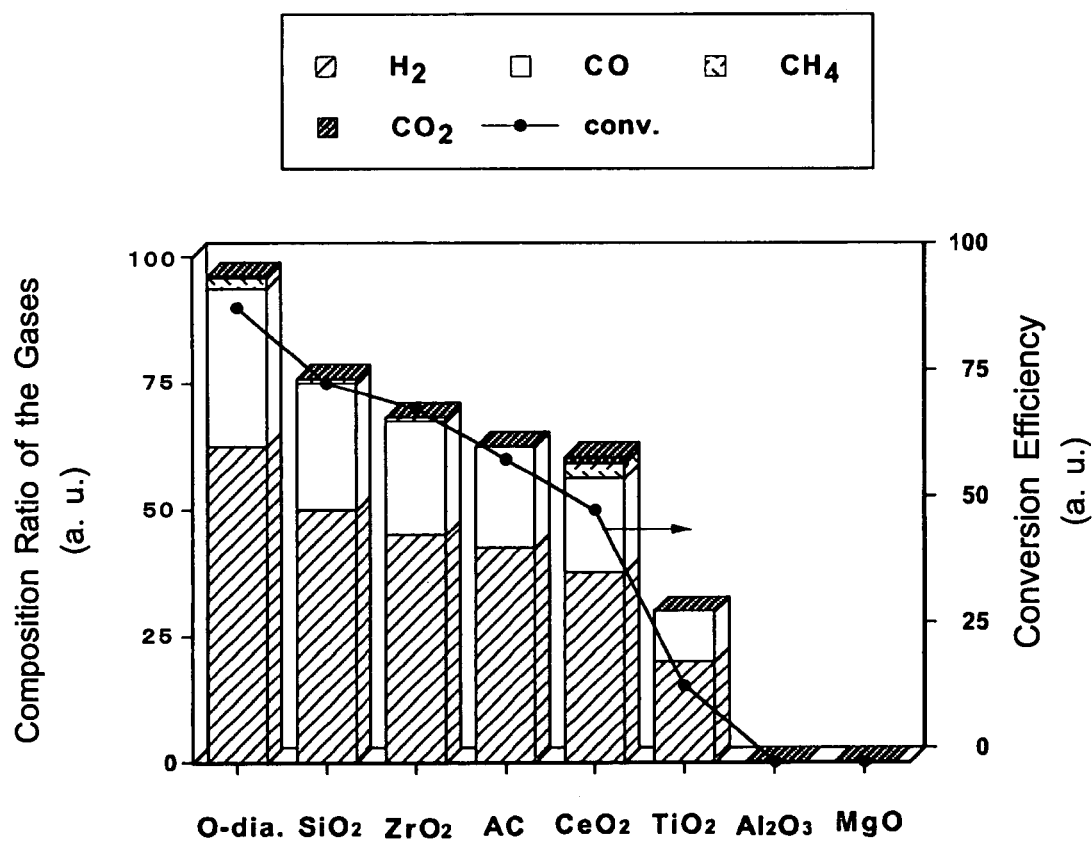
FIG. 3 is a graphic chart illustrating the hydrogen production efficiency obtained in the method using Ni metal catalyst and the substrate varied variously.

FIG. 3 is a graph illustrating the conversion efficiencies of methanol into hydrogen which were obtained for the catalyst of Ni and for every substrates of oxidized diamond (O-dia), silicon dioxide ($SiO_2$), zirconium diode ($ZrO_2$), activated carbon (AC), cerium diode ($CeO_2$), titanium diode ($TiO_2$), alumina ($Al_2O_3$) or magnesium oxide (MgO). In the graph, the ordinate axis in the right hand side represents the conversion efficiency, the abscissa axis represents the kind of the substrates and the ordinate axis in the left hand side represents the composition ratios of the gases, respectively. In the chart, the line graph represents the conversion efficiencies and the bar graph represents the composition ratios of the gases. Here, the conversion efficiencies and the composition ratios are represented by mol ratio, and the units of the ordinate axes are arbitrary scales for relative comparison.

As can be seen from the graph, a highest conversion efficiency is achieved when the substrate is made of oxidized diamond. The composition ratios of the Gases comprises the range of 60 to 70% of hydrogen gas and the residue of carbon monoxide, carbon dioxide and methane.

Figure 4:
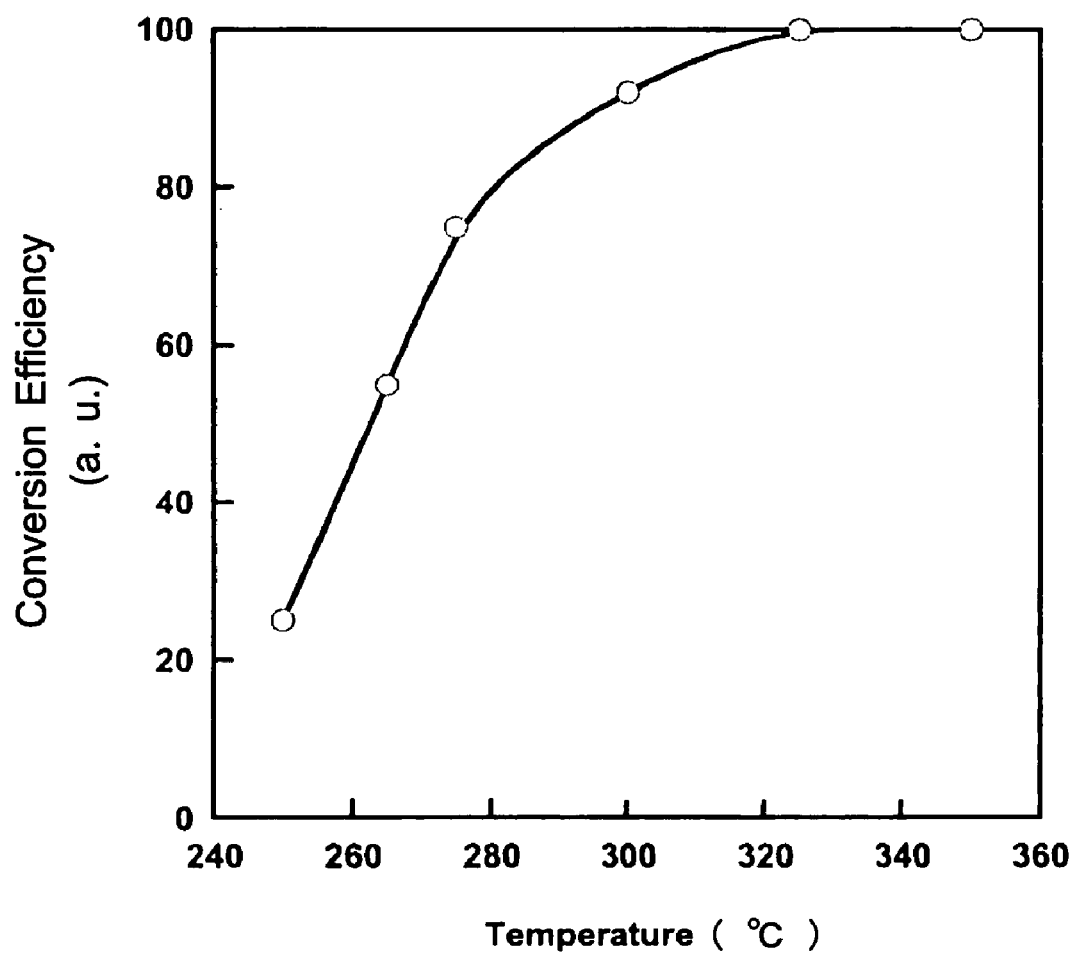
FIG. 4 is a graph illustrating how the hydrogen production efficiency depends on the substrate temperature.
Figure 5:
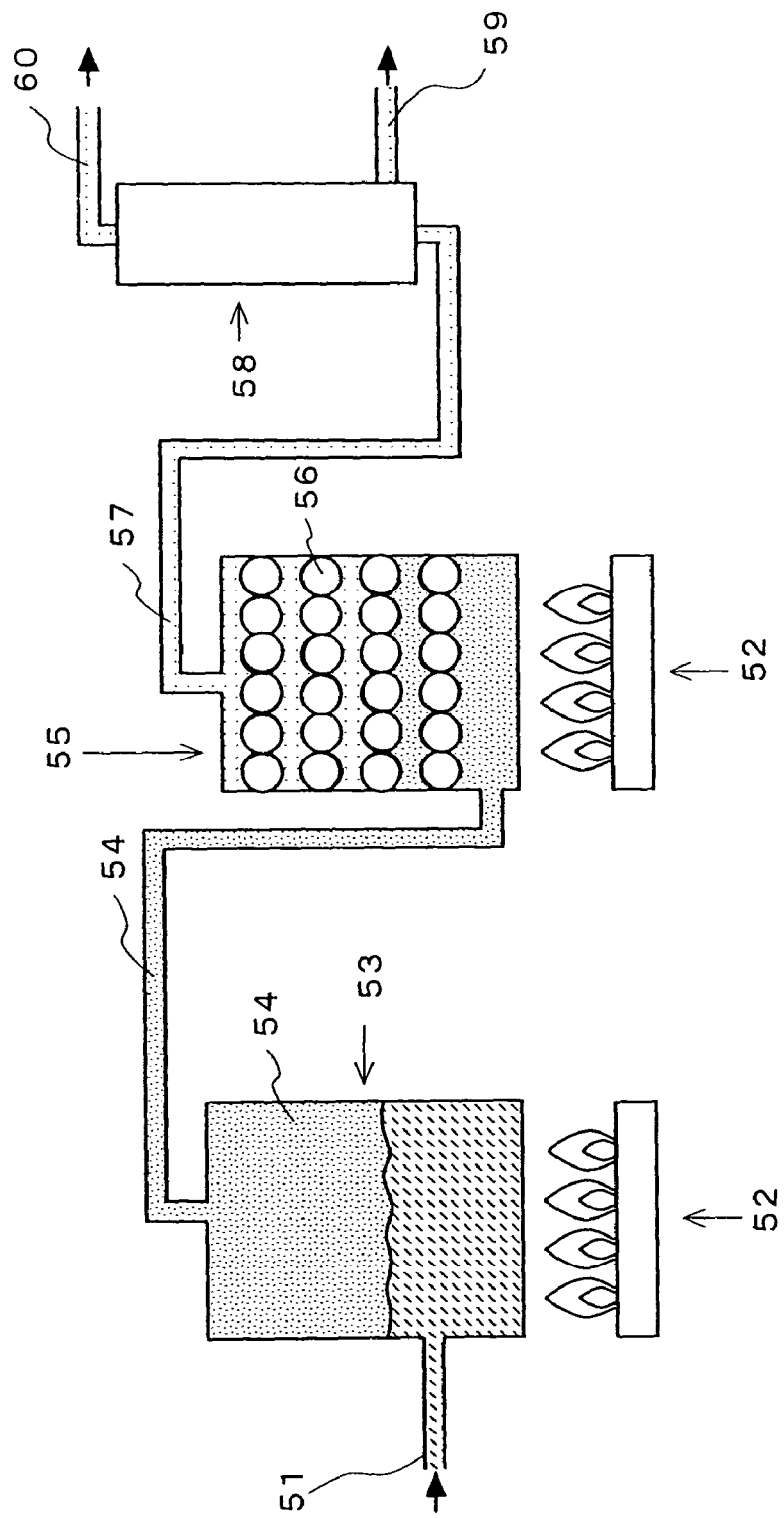
FIG. 5 is a diagram illustrating the makeup of a hydrogen producing apparatus in the prior art.

FIG. 4 is a graph illustrating the dependency of the conversion efficiency on the temperature of the substrate. The dependency was obtained for the substrate of oxidized diamond and the catalyst of Ni. In the graph, the ordinate axis represents the conversion efficiency, the abscissa axis represents a temperatures of the substrate, and the scale of ordinary axis is an arbitrary scale for relative comparison.

From this graph it is seen that a sufficient conversion efficiency is obtained when the substrate has a temperature of 300° C. or more.

From the specific example above, it is seen that an eminent hydrogen producing efficiency is obtained for the substrate composed of oxidized diamond, the catalyst composed of Ni and the substrate having a temperature of 300° C. or more.

Additionally, the term "oxidized diamond" used herein is intended to mean a diamond in which dangling bonds of carbon atom of its surface are terminated with oxygen.

INDUSTRIAL APPLICABILITY

As will be appreciated from the foregoing description, the method of the present invention allows producing hydrogen in the simple manner to heat a substrate loaded with a catalyst in methanol, hence it does require only one container instead of the hitherto indispensable two containers, one for methanol vaporization and one for methanol decomposition in the conventional apparatus, thereby it is possible to make it small in size and in weight. Moreover, the novel catalysis of methanol-decomposition is extremely high in rate of reaction, which is yielded by the combination of the abrupt temperature gradient directing towards liquid methanol from the surface of substrate, the catalysis of the substrate made of an oxide or oxidized material and the catalysis of a catalyst loaded on the substrate, hence it is possible to make the apparatus smaller in size and weight than the conventional one having the same hydrogen producing rate. Also, such an extremely high reaction rate of this novel catalysis of methanol decomposition, which is yielded by the combination of the abrupt temperature gradient directing towards liquid methanol from the surface of substrate, the catalysis of the substrate made of an oxide or oxidized material and the catalysis of a catalyst loaded on the substrate, reduces the energy consumption required to produce hydrogen. The present invention is therefore extremely useful when used such a field of automobiles of which the power is supplied by a fuel cell.

What is claimed is:

1. A method of producing hydrogen from methanol, comprising heating a substrate loaded with a catalyst in liquid methanol, wherein the substrate is made of a material selected from the group which consists of oxidized diamond, silicon dioxide, zirconium dioxide, cerium dioxide, titanium dioxide and activated carbon, and the catalyst is a catalyst selected from the group which consists of Ni, Co, Rh, Ir, Cu, Pt, and Ru, wherein an abrupt temperature gradient directing from a surface of said substrate toward said liquid methanol is formed, and a methanol decomposition reaction is yielded by said abrupt temperature gradient, the catalytic reaction of said catalyst, and by the catalytic reaction of said substrate decomposes methanol to generate hydrogen gas;

wherein during said heating of said substrate, said substrate is heated to a minimum of about 300° C.

2. A method of producing hydrogen from methanol as set forth in claim 1, characterized in that said substrate loaded with a catalyst is a substrate having electric conductivity, or a substrate having a resistive substance, and a means for said step of heating a substrate is an electrical power supplying means for heating by supplying electric current to said substrate having electric conductivity, or said substrate having a resistive substance.

* * * * *